Feb. 14, 1933.  H. H. GARNER ET AL  1,897,372
AIR CLEANER
Filed March 3, 1930
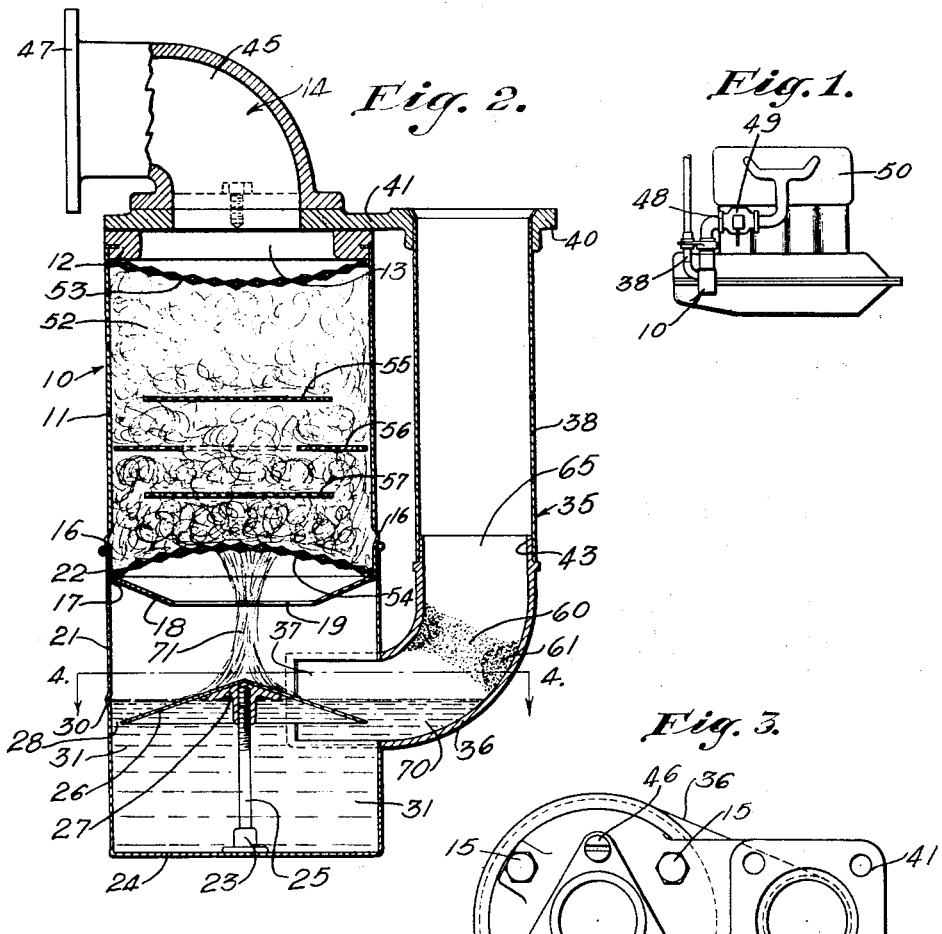
INVENTORS:
Herman H. Garner,
Fred R. Nohavec,
George H. Hopkins.
Ford W. Harris
ATTORNEY.

Patented Feb. 14, 1933

1,897,372

UNITED STATES PATENT OFFICE

HERMAN H. GARNER AND FRED R. NOHAVEC, OF CLAREMONT, AND GEORGE HAROLD HOPKINS, OF PASADENA, CALIFORNIA, ASSIGNORS TO VORTOX MANUFACTURING COMPANY, OF CLAREMONT, CALIFORNIA, A CORPORATION OF CALIFORNIA

AIR CLEANER

Application filed March 3, 1930. Serial No. 432,596.

This invention relates to air cleaners for removing dust and other injurious substances from air which is to enter an air-using device, such as a combustion engine, and relates particularly to the wet type of air cleaner in which a substantially non-volatile liquid, such as oil, is employed to assist the action of filtering foreign particles from the air stream. The type of air cleaner to which the invention particularly relates has a filter member consisting of a shell containing a filter medium. The upper part of the shell is connected to the intake of an engine, and the lower part of the shell has an oil container attached thereto. An air inlet is provided for directing the entering stream of air tangentially into the air cleaner so that when the engine is started and air is drawn into the cleaner, a vortex is created which throws dust particles to the wall of the oil container. The vortex formed by the whirling air carries oil into the body of filter medium in the filter member, wetting the filter medium so that a very large number of moist surfaces are presented to the air stream by the filter medium. In this air cleaner the heavier dust particles are removed centrifugally while the air is passing through the vortex, and the remaining dust particles are removed by the moist or wet filter medium through which the air must pass in its progress toward the carburetor of the combustion engine.

It is an object of the invention to provide an air cleaner having a removable oil container or cup which on being removed will disclose to view and to ready access the moist zone in the inlet of the air cleaner, thus making it possible for an operator to easily observe the condition of the air inlet and, if necessary, to clean such inlet when he cleans the oil cup and replenishes the oil therein. In air cleaners of the wet type, a moist zone is always present in the inlet adjacent to the point where the inlet enters the main body of the cleaner. This moist zone always tends to accumulate a deposit of dirt which partly clogs the inlet and interferes with the operation of the air cleaner. In previous air cleaners of the wet type, this moist zone has been more or less inaccessible and invisible, making observance by the operator of the need for cleaning the air inlet very unlikely and making it difficult for him to clean same. In the preferred form of our invention, the moist zone of the air inlet is attached directly to the oil cup and is removed from the cleaner assembly with the oil cup, therefore making it easy to observe and to clean both the oil cup and the moist zone of the air inlet.

It is also an object of the invention to provide a means for controlling the circulation of oil within the air cleaner. In the simple and preferred form of the invention disclosed herein, this means consists in a deflector plate so placed in the oil cup that it will permit a predetermined portion of the oil to be sprayed up into the filter but will prevent the remaining portion of oil below the deflector plate from being taken up into the filter and possibly on through the filter and into the engine. This oil controlling means permits dust to settle in the undisturbed oil between the deflector plate and the bottom of the oil cup.

A further object of the invention is to provide an air cleaner of the above character with means for controlling and evenly distributing a flow of air as it passes through the filter medium. This feature of the invention resides in baffles placed in the filter medium in positions to distribute the air flow through the filter medium and to prevent the air from passing directly up through the filter medium by following paths that may be unavoidably left in the packing of the filter medium in the filter member.

A further object of the invention is to provide an air filter having air inlet and outlet ports in a structure which may be permanently secured to the combustion engine and to make the filter member readily removable from this permanent inlet and outlet structure, so that it will not be necessary to remove such structure each time it is desired to remove the filter member for the purpose of inspecting, cleaning, or renewing the same.

A further object of the invention is to provide an air cleaner so constructed that a maximum portion of the air entering the cleaner will pass through the vortex of the cleaner before entering the filter member.

It is an object and feature of the invention to place the air inlet coincident with or adjacent to the quiet oil level of the air cleaner and at a relatively great distance below the entrance to the filter member. When the inlet is placed in a high position or position adjacent to the air inlet of the filter member most of the air travels in a spiral path down to the surface of the oil and there enters the vortex, but there is a tendency to crowd a small portion of the air directly across to the opening of the filter member. This portion of air, therefore, does not pass through the centrifugal action of the vortex and therefore carries all of its dust content directly into the filter medium.

Further objects and advantages of the invention will be made evident throughout the following part of the specification.

Referring to the drawing which is for illustrative purposes only,

Fig. 1 is a side elevation of an internal combustion engine to which our improved form of air cleaner has been applied.

Fig. 2 is a vertical section through an air cleaner embodying the present invention.

Fig. 3 is a plan view of Fig. 1.

Fig. 4 is a horizontal cross section on a plane represented by the line 4—4 of Fig 2.

In the preferred embodiment of the invention shown in the drawing, 10 indicates a filter member including a cylindrical shell 11 having secured in its upper end a circular end plate 12 having a relatively large central opening 13. The filter member 10 is secured to an inlet and outlet or supporting structure 14 by means of bolts 15 which screw into the end plate 12. The cylindrical shell 11 has an annular, outwardly projecting bead or ridge 16 formed near its lower end and has its extreme lower edge 17 turned inwardly so as to provide a lip or flange for engaging and securing a conical inlet plate 18 having an inlet opening 19 which permits communication between the interior of the filter member 10 and the interior of an oil container or cup 21 which attaches to the lower end of the cylindrical shell 11, this cup 21 having an upper edge portion or area 22 which fits over that part of the cylindrical shell 11 below the annular ridge 16. By means of a fitting 23 secured to the bottom wall 24 of the cup 21, a centralized vertical post 25 supports a conical baffle plate 26 which has a fitting 27 secured to the under face thereof, in the manner shown in Fig. 2. The deflector plate 26 is preferably in the form of a flat cone and is of slightly smaller diameter than the interior of the cup 21 so that an annular space 28 exists between the annular edge of the deflector plate 26 and the wall of the cup 21.

An intermediate ridge or bead 30 is formed in the cylindrical wall of the cup 21 to designate the level of a body of oil 31 placed within the cup 21. It will be noted that the level of the oil designated by the bead 30 is above the lower edge of the deflector plate 26. This, however, is the quiet oil level or, in other words, the level existing when the engine to which the device is attached is not in operation. A tangential air inlet 35 is composed of an inlet member 36 which leads through an opening 37 into the cup 21 in tangential direction, as shown in Fig. 4, and a stationary inlet pipe 38 which is secured to and extends downwardly from a projecting portion 40 of a plate 41 which forms part of the supporting structure 14. The lower end of the pipe 38 receives the reduced upper end 43 of the inlet member 36, in the manner shown in Fig. 2. It is to be noted that the entrance opening 37 of the inlet member 36 is substantially centralized with respect to the quiet oil level indicated by the bead 30 and is removed an appreciable distance from the upper end of the cup 21 and from the inlet opening 19 leading into the filter member 10.

The supporting structure 14 includes an elbow fitting 45 which is secured to the plate 41 by means of cap screws 46 and has a flange 47 by which it may be attached, as shown in Fig. 1, to the air inlet 48 of the carburetor 49 of an engine 50. The filter member 10 includes a mass or body of filter medium 52 consisting preferably of fine wires bent into a great multitude of small loops and curved portions so that a matted effect is accomplished therein, but other materials may be employed, such as steel wool and matted vegetable fibers. The filter medium 52 is held in the cylindrical shell 11 between inwardly dished upper and lower end screens 53 and 54, and within the filter medium 52 baffle members 55, 56, and 57 are located. The purpose of these baffles is to deflect the movement of air through the filter medium 52 from a straight vertical path and to prevent the movement of air from following the lines of least resistance through the filter medium. The baffles 55 and 57 are preferably circular discs, and the baffle 56 has the form of an annulus, the baffle 56 being placed between the baffles 55 and 57 in the manner shown. Best results are accomplished when the baffles are made from perforated plates so that a portion of the air stream may pass vertically while the remainder thereof is deflected laterally or diagonally through the filter medium 52.

It is characteristic of air filters of the wet type in which liquid is employed to assist in the filtering action that a moist zone is established in the air inlet, such a moist zone being indicated at 60 in Fig. 2, in which moist zone a ring of dust 61 accumulates so as to restrict the effective air inlet. In our present invention that portion of the air inlet means 35 in which the moist zone is formed, namely the inlet member 36, is secured to the oil cup or container 21 and is detachable with the oil cup 21 from the remaining or upper parts of the filter device. When the oil cup is removed, the upper end or inlet portion 65 of the member 36 is immediately disclosed to view so that an operator may quickly inspect same and may remove the accumulated annular wall of dust 61 from the moist zone of the inlet, thus returning the air inlet to fully efficient condition.

In Fig. 2 it will be noted that the oil 31 extends into the lower portion of the air inlet member 36 at 70. This condition of the oil exists when the air utilizing device, such as the engine 50, is not in operation. When the engine 50 is in operation, the air entering through the air inlet member 36 forms a vortex which carries the upper portion of the oil 31 upwardly into the filter medium 52, as indicated at 71. Therefore, during operation of the device no body of oil, such as indicated at 70, exists within the inlet member 36, but the level of the oil in the bottom of the cup 21 is maintained substantially at the lower outer edge of the deflector plate 26. The body of oil under the deflector plate 26 is maintained in such undisturbed condition that dust and other foreign particles separated from the entering air stream will settle to the bottom of the cup 21 and form a flat body or cake on the bottom 24. Removal of the cup 21 from the filter member 10 also results in removal of the inlet member 36 from the inlet pipe or tube 38 and exposes to view and access both the interior of the cup 21 and the interior of the air inlet member 36. To clean the accumulated dust and foreign particles from the bottom of the cup 21, it is merely necessary to unscrew the deflector plate 26 which may be readily replaced on the vertical post 25 after the bottom of the cup has been cleaned. Then, after refilling the bottom of the cup with clear oil to the level indicated by the bead 30, the cup 21 may be replaced.

When it is desired to wash out the filter member 10, the cup 21 is removed, whereupon, by taking out the cap screws 15 which thread into the plate member 12, the filter member 10 may be removed from the supporting structure of the air cleaning device, and by immersion in a light hydrocarbon, such as gasoline or coal-oil, substantially all accumulated substances may be washed from the body of filter medium 52. After such cleaning, the removable or detachable parts of the air cleaning device may be readily replaced in condition for operation.

Although we have herein shown our invention in simple and operative form, it is recognized that certain parts or elements thereof are representative of other parts, elements, or mechanisms which may be employed in substantially the same manner to accomplish substantially the same results; therefore, it is to be understood that the invention is not to be limited to the details disclosed herein but shall have the scope of the following claims.

We claim as our invention:

1. An air cleaner of the character described, including: a supporting structure adapted for connection to the air inlet of an air utilizing device; a filter member detachably secured to said supporting structure in such position that air entering said air utilizing device will pass through said filter member; a cup for holding a liquid, detachably secured to said filter member, said cup having walls forming an air inlet member leading into said cup in a position spaced downwardly from the lower end of said filter member, said walls being so formed that the interior of said air inlet member will be exposed and accessible when said cup is detached from said filter member; and an air inlet pipe leading downwardly from said supporting structure so as to communicate with the entrance opening of said air inlet member.

2. An air cleaner of the character described, including: a supporting structure adapted for connection to the air inlet of an air utilizing device; a filter member detachably secured to said supporting structure in such position that air entering said air utilizing device will pass through said filter member; a body of filter substance sustantially filling said filter member; baffles within said body of filter substance for deflecting air in its passage through said body of filter substance; a cup for holding a liquid, detachably secured to said filter member, said cup having walls forming an air inlet member leading into said cup, said walls being so formed that the interior of said air inlet member will be exposed and accessible when said cup is detached from said filter member; and an air inlet pipe leading downwardly from said supporting structure so as to communicate with the entrance opening of said air inlet member.

3. An air cleaner of the character described, including: a filter member adapted for connection to the air inlet of an air utilizing device; a cup for holding a liquid, detachably secured to said filter member, said cup having walls forming an air inlet member leading into said cup, said walls being so formed that the interior of said air inlet member will be exposed and accessible when said cup is detached from said filter member; and a deflector member supported in spaced relationship to the bottom of said cup for controlling the amount of oil which may be sprayed from said cup into said filter member by air passing through said cup into said filter member.

4. An air cleaner of the character described, including: a supporting structure adapted for connection to the air inlet of an air utilizing device; a filter member detachably secured to said supporting structure in such position that air entering said air utilizing device will pass through said filter member; a cup for holding a liquid, detachably secured to said filter member, said cup having walls forming an air inlet member leading into said cup, said walls being so formed that the interior of said air inlet member will be exposed and accessible when said cup is detached from said filter member; an air inlet pipe leading downwardly from said supporting structure so as to communicate with the entrance opening of said air inlet opening; and a deflector member supported in spaced relationship to the bottom of said cup for controlling the amount of oil which may be sprayed from said cup into said filter member by air passing through said cup into said filter member.

5. An air filter of the class described, comprising: a shell containing a filtering medium; a cup detachably connected to said shell, and being adapted to contain a liquid, there being a space between the lower end of said filtering medium and said liquid; an inlet communicating with the lower part of said space for admitting air in such a manner as to produce a vortex; and a baffle means for controlling the amount of liquid which can be picked up by the air vortex, said baffle means being so formed as not to disturb said air vortex.

6. An air filter of the class described, comprising: a shell containing a filtering medium; a cup detachably connected to said shell, and being adapted to contain a liquid, there being a space between the lower end of said filtering medium and said liquid; an inlet connected to said cup near the level of said liquid and communicating with the lower part of said space for admitting air in such a manner as to produce a vortex; and a baffle means for controlling the amount of liquid which can be picked up by the air vortex, said baffle means being so formed as not to disturb said air vortex.

7. An air filter of the class described, comprising: a shell containing a filtering medium; a cup detachably connected to said shell, and being adapted to contain a liquid, there being a space between the lower end of said filtering medium and said liquid; an inlet communicating with the lower part of said space for admitting air in such a manner as to produce a vortex; and a conical means arranged with its apex emerging from said liquid for controlling the amount of liquid which can be picked up by the air vortex, said conical means being so formed as not to disturb said air vortex.

8. An air filter of the class described, comprising: a shell containing a filtering medium; a cup detachably connected to said shell, and being adapted to contain a liquid, there being a space between the lower end of said filtering medium and said liquid; an inlet connected to said cup near the level of said liquid and communicating with the lower part of said space for admitting air in such a manner as to produce a vortex; and conical means arranged with its apex emerging from said liquid for controlling the amount of liquid which can be picked up by the air vortex, said conical means being so formed as not to disturb said air vortex.

In testimony whereof, we have hereunto set our hands at Claremont, California, this 21st day of February, 1930.

HERMAN H. GARNER.
FRED R. NOHAVEC.
GEORGE HAROLD HOPKINS.